United States Patent
Leiber et al.

(10) Patent No.: US 10,369,979 B2
(45) Date of Patent: Aug. 6, 2019

(54) ACTUATION SYSTEM FOR AT LEAST ONE HYDRAULICALLY ACTUABLE DEVICE, IN PARTICULAR A VEHICLE BRAKE

(71) Applicant: IPGATE AG, Pfäffikon (CH)

(72) Inventors: Heinz Leiber, Oberriexingen (DE); Thomas Leiber, München (DE)

(73) Assignee: IPGATE AG, Pfäffikon (CH)

( * ) Notice: Subject to any disclaimer, the term of this patent is extended or adjusted under 35 U.S.C. 154(b) by 0 days.

(21) Appl. No.: 15/532,731

(22) PCT Filed: Dec. 2, 2015

(86) PCT No.: PCT/EP2015/078339
§ 371 (c)(1),
(2) Date: Oct. 24, 2017

(87) PCT Pub. No.: WO2016/087506
PCT Pub. Date: Jun. 9, 2016

(65) Prior Publication Data
US 2018/0126970 A1 May 10, 2018

(30) Foreign Application Priority Data
Dec. 2, 2014 (DE) .................. 10 2014 117 727

(51) Int. Cl.
*B60T 13/74* (2006.01)
*B60T 7/04* (2006.01)
(Continued)

(52) U.S. Cl.
CPC ............ *B60T 13/745* (2013.01); *B60T 7/042* (2013.01); *B60T 8/363* (2013.01); *B60T 8/4018* (2013.01); *B60T 8/4081* (2013.01)

(58) Field of Classification Search
CPC ........ B60T 13/745; B60T 7/042; B60T 8/363; B60T 8/4081; B60T 8/4018
See application file for complete search history.

(56) References Cited

U.S. PATENT DOCUMENTS

2017/0232948 A1* 8/2017 Leiber ................... B60T 8/4081
303/11
2017/0327098 A1* 11/2017 Leiber ..................... B60T 7/042

FOREIGN PATENT DOCUMENTS

CN         103253251 A    8/2013
DE    102005055751 A1    11/2006
(Continued)

OTHER PUBLICATIONS

Int'l Preliminary Report on Patentability dated Jun. 6, 2017 in Int'l Application No. PCT/EP2015/078339.
(Continued)

*Primary Examiner* — Vishal R Sahni
(74) *Attorney, Agent, or Firm* — Panitch Schwarze Belisario & Nadel LLP

(57) ABSTRACT

An actuation system for at least one hydraulically actuatable device, e.g., a vehicle brake, may include an actuation device, e.g., a brake pedal, at least one first pressure source that can be actuated using the actuation device, and a second pressure source having a pressure-generating arrangement that is moveable in two directions, and which includes an electro-mechanical drive for the pressure-generating arrangement. Each pressure source is connected via at least one hydraulic line to the hydraulically actuatable device for supplying pressurizing medium. A valve device may regulate pressure of the hydraulically actuatable device. Pressurizing medium can be supplied in a controlled manner in both movement directions of the pressure-generating arrangement. Provision is made for two working chambers of the second pressure source to be connected by a hydraulic line, and a valve device may be arranged in the hydraulic line.

15 Claims, 1 Drawing Sheet

(51) Int. Cl.
*B60T 8/40* (2006.01)
*B60T 8/36* (2006.01)

(56) References Cited

FOREIGN PATENT DOCUMENTS

| | | |
|---|---|---|
| DE | 102010023865 A1 | 12/2011 |
| DE | 102011080312 A1 | 2/2012 |
| DE | 102010050133 A1 | 5/2012 |
| DE | 102012002791 A1 | 8/2013 |
| KR | 20140135043 A | 11/2014 |

OTHER PUBLICATIONS

Int'l Search Report dated Feb. 23, 2016 in Int'l Application No. PCT/EP2015/078339.
Search Report dated Aug. 12, 2015 in DE Application No. 102014117727.4.
Office Action dated Mar. 21, 2019 in CN Application No. 201580065369.3.

\* cited by examiner

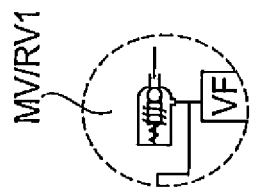
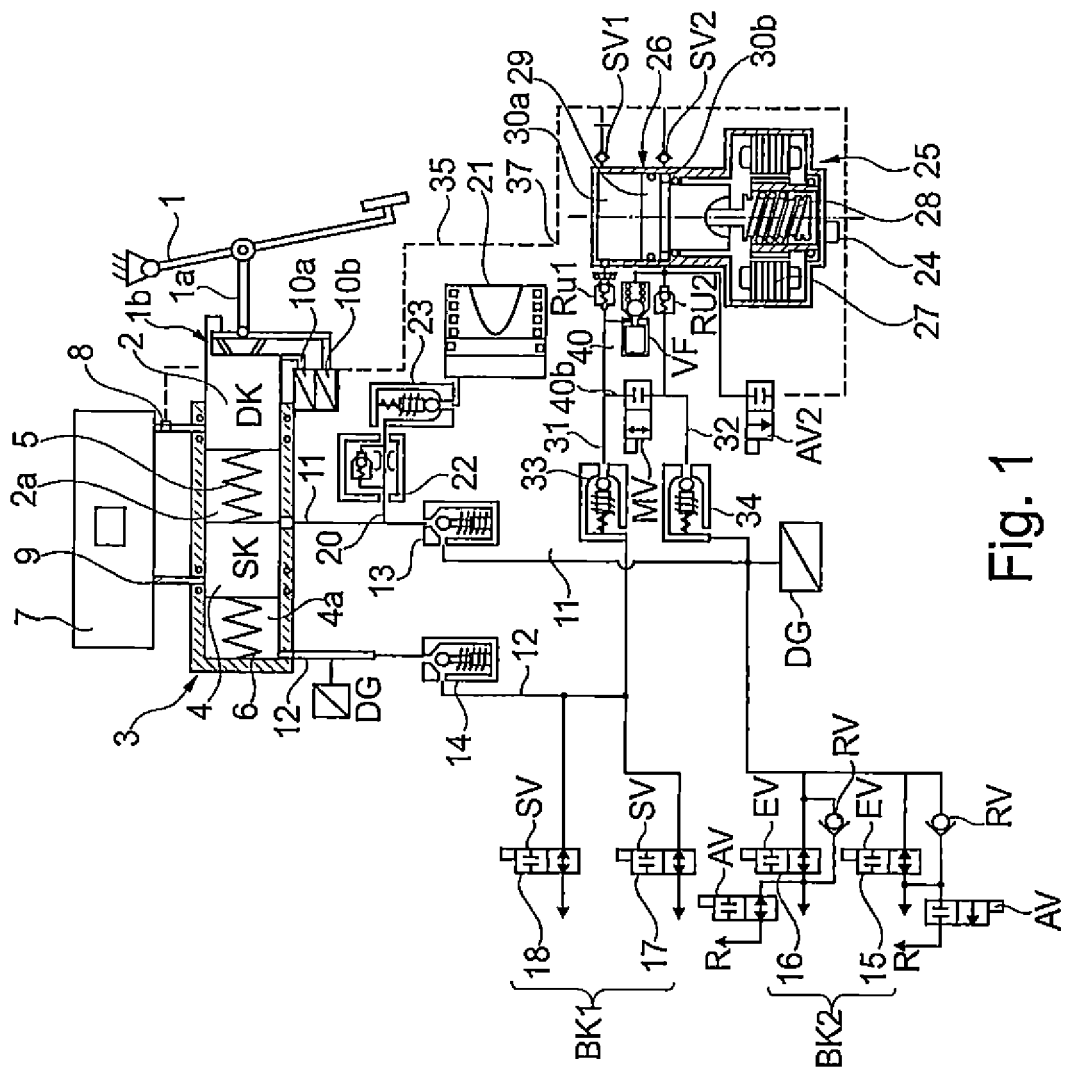
Fig. 1a
Fig. 1

ACTUATION SYSTEM FOR AT LEAST ONE HYDRAULICALLY ACTUABLE DEVICE, IN PARTICULAR A VEHICLE BRAKE

CROSS-REFERENCE TO RELATED APPLICATION

This application is a Section 371 of International Application No. PCT/EP2015/078339, filed Dec. 2, 2015, which was published in the German language on Jun. 9, 2016 under International Publication No. WO 2016/087506 A1, which claims priority to German Patent Application No. 10 2014 117 727.4, filed Dec. 2, 2014, the disclosures of which are incorporated herein by reference.

DESCRIPTION

Actuation system for at least one hydraulically actuatable device, in particular a vehicle brake system

PRIOR ART

DE 10 2011 080312 A1 discloses a brake actuation device that provides various advantages, such as structural and functional integration, elimination of a pump and the associated noises, weight reduction and high dynamics. In this device, an intake valve and an exhaust valve are assigned to the wheel brakes, resulting in the actuation device being structurally relatively complicated.

Furthermore, the applicant's DE 10 2012 002 791 already describes a brake actuation device in which, for the purpose of structural simplification, each valve device has an intake/exhaust switching valve that is assigned to a wheel brake, which is particularly operated in multiplex mode (MUX).

However, the valve complexity and thus the costs are still high in this actuation device. In this actuation device, hydraulic fluid can be conveyed during the pre-stroke and the return stroke by means of a double-stroke piston. The delivery volume depends on the dimensions and stroke of the piston-cylinder unit.

OBJECT OF THE INVENTION

The object of the invention is therefore to provide an inexpensive actuation system distinguished by greater flexibility (for example in pressure control) or improved or additional applications and structural simplicity.

ACHIEVING THE OBJECT

The object of the invention may be achieved with the features as recited in the accompanying claims.

Advantageous embodiments of the invention are contained in the sub-claims, which are referred to herein.

The invention creates an actuation system that is characterised by increased flexibility with regard to delivery volume, and therefore has an improved or extended application range.

Thus, with corresponding volume absorption of the braking system, e.g. as a result of brake pad clearance, a relatively large active area of the pressure source, in particular of the double-stroke piston, can be active at the start of volume delivery in the pre-stroke. In the case of higher pressure during pre-stroke and return stroke, a smaller active area is activated by means of a valve device, in particular a solenoid valve. The volume conveying device can not only deliver volumes into the brake circuits, but also return volumes, e.g. for pressure reduction, from the brake circuits into the volume conveying device by correspondingly switching the valve device. When pressure reduction is imminent, the double-stroke piston can be positioned for maximum volume absorption by means of a corresponding valve circuit. If the double-stroke piston is not in the optimal forward position for pressure reduction, the piston can be moved into the forward stroke end position by means of the valve device, in particular by opening the piston valves (VF, AV2), so that it can absorb the full volume during pressure reduction or return stroke. In order to balance the pressures in the brake circuits, pressure compensation, which is not permitted to act in the case of brake circuit failure, can be produced by a valve device during pressure build-up and pressure reduction.

The invention and its embodiments create an actuation device in a very advantageous manner, in which, through rapid reversal of rotation direction and valve switching, there is no appreciable interruption of pressure reduction and pressure build-up in the suction movement of the plunger during additional delivery. The volume conveying device (VF) formed by means of the second pressure source, in particular a piston-cylinder unit, is flexible for all requirements, e.g. pressure reduction or volume overflow from the brake circuits into the volume conveying device, positioning the piston, parallel connection of the volume conveying device, pressure reduction from the volume conveying device into the return flow and, in particular, a stepped piston with piston surfaces in different sizes, as a result of which a reduction in the motor torque is made possible by the smaller piston active surface acting by means of a corresponding valve circuit at high pressure. In particular, the stepped piston can have pre- and return strokes and the working surfaces of the piston that are tuned to the torque and rotational speed of the drive motor.

Furthermore, it is advantageous to connect the volume conveying device (VF) to the return flow by means of an additional valve device.

Further embodiments of the invention or of its components and other advantages are shown in the drawing and in the following description of the figures.

DESCRIPTION OF FIGURES

They show:

FIG. 1 An embodiment of the actuation system according to the invention, using the example of a brake actuation system.

FIG. 1a A combined solenoid and non-return valve as a detail of the actuation system according to FIG. 1.

The brake actuation device shown in FIG. 1 has an actuation device, in particular a pivotably mounted brake pedal 1 that acts via a pedal tappet 1a and an elastic mechanism or element 1b on a first piston 2 of a first pressure source in the form of a first piston-cylinder unit 3. The first piston-cylinder device 3 has an additional piston 4. Pistons 5 and 6 are arranged between pistons 2, 4 or between the base of the first piston-cylinder unit and piston 4. A reservoir 7 is connected via hydraulic lines 8, 9 to the working chambers 2a, 4a delimited by the pistons 2, 4. The piston-cylinder unit shown here thus has features of a tandem main cylinder, which can advantageously be provided with central valves. The pistons or cylinders can also be arranged in a twin configuration, i.e. parallel to each other, if the overall length is decisive. The movement of preferably the first piston 2 can be determined by way of, in particular redundant, path sensors 10a, 10b. In this case, the sensors can be activated by two different actuating elements, piston 2 and pedal tappet 1a, which are connected to the sensors via corresponding, in particular mechanical, actuating devices or elements. By inserting an elastic device 1b, that e.g. has at least one suitable spring, the actuating force can be measured, aside from the additional pedal distance measurement, by the differential movement, which is very valuable for fault detection. This is described in more detail in the applicant's German patent application DE 10 2010 050133.6, to which reference is made here for a more detailed explanation.

The electronic control and regulating unit (ECU) usually used to analyse the sensor signals and control or regulate the functions in such systems is not shown here.

Hydraulic connections 11, 12, in which provision is made for a pressure transmitter DG and valve devices, lead from the working chamber of the first piston-cylinder unit to wheel brakes (not shown here). The valve devices have, in particular normally open, separating valves 13, 14 as well as one, in particular a normally open, intake/exhaust solenoid valve 15, 16, 17, 18 for each wheel brake, which are assigned to two brake circuits BK1, BK2 in this exemplary embodiment. Alternatively, in the case of at least one brake circuit, provision can be made for separate intake valves EV and exhaust valves AV, as is shown in the drawing for the lower brake circuit. The exhaust valves AV are arranged here in a return line R, which leads to the unpressurised reservoir 7. Furthermore, a non-return valve RV is arranged in each bypass line to the valve EV, as is the case with existing ABS.

The separating valves 13, 14 are used in pressure modulation and braking force amplification. This is basically done in the same manner as in the electro hydraulic brake, as described in the "Bremsenhandbuch" (Braking Manual), 2nd edition, published by Vieweg.

A hydraulic connection 20 leads to a path simulator 21 from the first working chamber of the piston-cylinder unit 3. A throttle 22 with a parallel non-return valve and a switching valve 23, which is in particular normally closed, are arranged in the hydraulic connection 20.

A second pressure source as a function of a volume conveying device or intensifier device 25 has a second piston-cylinder unit 26 (plunger) and a high-dynamic electromotive drive 27 with a transmission 28. The transmission 28 is advantageously a ball screw transmission. In this case, the spindle acts on a plunger piston 29, which is designed as a stepped double-stroke piston (DHK) and has at least two working or pressure chambers 30a, 30b, which are in particular delimited by differently sized active surfaces of the double-stroke piston. The motor acts linearly on the plunger piston 29, enabling the function of the braking force amplification during driver braking and the pressure modulation of a slip control system and driver assistance systems. The rotation of the motor or spindle can be sensed by means of a rotation angle sensor 24. At least in the case of brake pressures >40 bar, it is expedient to provide the spindle pitch with self-locking or almost self-locking gears or a locking device on the transmission so that brake circuit failure does not occur in the event of a plunger failure and a leaky safety valve 33, 34. This is advantageous when the drive motor fails during the pressure modulation and there is simultaneously a leaky safety valve 33, 34, e.g. as a result of dirt. Without self-locking, the pressure from the corresponding brake circuit would push the piston back, which equals a brake circuit failure.

Alternatively, an additional solenoid valve 33a, which in this case is closed, can be inserted downstream of the safety valves. This is important because, with the safety valve open, both brake circuits interact and the redundancy of the two brake circuits is lost. In this case, it is favourable to make the return spring force relatively large. This prevents the pressurising medium from a brake circuit with a leaky valve from overflowing into the other brake circuit during an ABS braking with different pressure levels in the brake circuits.

Brake circuit failure detection (BKA) can expediently be performed by comparing the plunger path with the pressure or motor current using the pressure-volume characteristic curve of the brake circuits or individual wheel cylinders. In the event of brake circuit failure outside the valve block (HCU), the leaky wheel cylinder circuit is appropriately separated by means of the corresponding intake/exhaust valve 15-18.

Hydraulic connections 31, 32 lead from the working chambers 30a, 30b of the second piston-cylinder unit 26 to the hydraulic connections 11, 12 or the brake circuits BK1, BK2, wherein one of the aforementioned switching valves or safety valves 33, 34 is arranged in each connection 31, 32, with which the brake circuits BK1, BK2 subjected to brake pressure by the double-stroke piston 29 can be separated. In addition to valves 33, 34, provision can be made for an additional valve in one of the brake circuits. This means that a redundant valve is available in this brake circuit in the event of a brake circuit failure, and the braking force amplification in the other circuit remains intact.

A hydraulic connection 35 leads from the working chambers 30a, 30b of the double-stroke piston 29 to the reservoir 7. Non-return valves SV1, SV2, which are assigned to the working chambers 30a, 30b and close to the reservoir, are arranged in this hydraulic connection. The hydraulic lines 31, 32 originating from the working chambers 30a, 30b are connected via a connecting line 40. A normally closed switching valve VF is arranged in this connecting line 40. In addition, closing non-return valves Ru1, RU2 are arranged in lines 31 and 32 to the wheel brakes. In this case, the non-return valves Ru1, RU2 are (as viewed from the direction of working chambers 30a, 30b of the second pressure source or piston-cylinder arrangement) arranged in the hydraulic lines 31 and 32, respectively, one circuit 31 (BK1) in front and the other circuit 32 (BK2) behind the opening of the connecting line 40; in other words, line 40 flows between valve Ru1 and valve 33 into line 31, and between working chamber 30b and valve RU2 into line 32. Thus, during the return stroke of the double-stroke piston, the volume can flow out of the working chamber 30b via the open valve VF into the hydraulic line 31 and the valve 33 thereby the brake circuit BK1, which is particularly important when the other brake circuit fails and the valve MV described in detail below is closed. Outflow into the working chamber 30a is prevented by the non-return valve Ru1. At least one of the non-return valves Ru1, RU2 can be combined with the switching valve VF in a valve device or a structural unit, as is shown in detail in FIG. 1a with respect to Ru1. Optionally, provision can also be made for a second connecting line 40b between the lines 31, 32 upstream of the valves 33, 34 (as viewed from the direction of the second pressure source), into which an additional normally closed switching valve MV is connected, for separating the hydraulic circuits. During volume conveying, e.g. during pressure build-up, both brake circuits 31, 32 or BK1, BK2 are supplied with the valve MV open. If a brake circuit fails, the valve MV can be closed, which means that only the intact brake circuit is supplied. A line 35 leads from line 32 (or optionally from 31) to the reservoir 7 from a branch in front of the non-return valve. An additional normally closed switching valve AV2 is (optionally) arranged in this. When the switching valve AV2 is open, the second pressure source or the double-stroke piston can be switched to a return stroke during the braking or ABS function, without volume being conveyed into brake circuit BK1 or BK2 during the return stroke. This means that the pressure in the brake circuits can be reduced both in multiplex mode (MUX) and without MUX, in particular in the case of μ-step when volume conveying is insufficient for pressure reduction with the double-stroke piston 29.

If the double-stroke piston is not in the optimal forward position for pressure reduction, the piston can be moved into the forward stroke end position by means of the valve device, in particular by opening the piston valves (VF, AV2), so that it can absorb the full volume during pressure reduction or return stroke. Valves 33 and 34 are closed.

In order to balance the pressures in the brake circuits, pressure compensation, which is not permitted to act in the case of a brake circuit failure, can be produced by a valve device (VF and MV) during pressure build-up and pressure reduction. In this case, valve MV is closed when valve VF is open.

In some circumstances, it may also be advantageous to make provision for the second piston-cylinder unit (plunger) to have two working chambers in a tandem arrangement. In the inventive solution, the piston-cylinder unit 26 serves, as it were, for the brake pressure build-up and brake pressure reduction, for the realisation of the ABS and traction control, as well as assistance functions. By means of the electromotive drive, these functions can also be improved by means of finely dosed pressure control with variable pressure increase velocities and, in particular, pressure loss velocities. Both the valves and hydraulic lines must be designed with the lowest amount of flow resistance possible, so that advantageously the fastest possible pressure build-up and pressure reduction can be realised by means of the piston-cylinder system. This ensures that the piston-cylinder system or the piston speed alone determines the pressure build-up and pressure reduction speed. It is advantageous to use pressure-compensated seat valves or gate valves with low temperature dependence and a short switching time. Operation in multiplex and the resulting advantages are described in detail in the applicant's German patent application DE 10 2005 055751.1, to which reference is hereby made for a more detailed explanation.

REFERENCE LIST

1 Brake pedal
1a Pedal tappet
1b Elastic mechanism or element
2 Piston (DK)
2a Working chamber or pressure chamber
2b Working chamber or pressure chamber
3 First pressure source or piston-cylinder unit
4 Piston (SK)
4 Spring
6 Spring
7 Reservoir
8 Hydraulic line
9 Hydraulic line
10a Path sensor
10b Path sensor
11 Hydraulic line
12 Hydraulic line
13 Isolation valve
14 Isolation valve
15 2/2-way solenoid valve
16 2/2-way solenoid valve
17 2/2-way solenoid valve
18 2/2-way solenoid valve
20 Hydraulic line
21 Path simulator
22 Throttle
23 Switching valve
24 Path or rotary sensor
25 Intensifier device
26 First pressure source or piston-cylinder unit
27 Electromotive drive
28 Transmission
29 Double-stroke piston (DHK) or plunger piston
30a Working chamber
30b Working chamber
31 Hydraulic line or connection
32 Hydraulic line or connection
33 Switching valve
34 Switching valve
35 Hydraulic line
36 2/2-way solenoid valve
37 Non-return valve
38 Pressure sensor
40 Hydraulic line or connection
40b Hydraulic line or connection
AV Exhaust valve
AV2 Switching valve
BK1 Brake circuit 1
BK2 Brake circuit 2
EV Intake valve
R Return line
RV Non-return valve
RV1 Non-return valve
RV2 Non-return valve
SV1 Non-return valve
SV2 Non-return valve
MV Switching valve
VF Switching valve

The invention claimed is:

1. An actuation system for at least one hydraulically actuatable device, comprising:
an actuation device,
at least one first pressure source configured to be actuated using the actuation device, and a second pressure source, including
a pressure-generating organ that is moveable in two directions, wherein the pressure-generating organ includes a piston, and
an electro-mechanical drive for the pressure-generating organ,
wherein the at least one first pressure source is connected via at least one first hydraulic line and the second pressure source is connected via at least a second hydraulic line and a third hydraulic line to the hydraulically actuatable device in order to supply the at least one first pressure source and the second pressure source with pressurising medium or to otherwise pressurise them, and
the actuation system further comprising a valve arrangement configured to regulate pressure of the hydraulically actuatable device,
wherein pressurising medium is enabled to be supplied in a controlled manner by the second pressure source in both movement directions of the pressure-generating organ, wherein the second and third hydraulic lines are connected to respective ones of the two working chambers of the second pressure source and are connected by means of a fourth hydraulic line, and wherein a valve device is arranged in the fourth hydraulic line connecting the two working chambers; and wherein the actuation system further comprises a first non-return valve disposed in the second hydraulic line between a first working chamber of the two working chambers and the fourth hydraulic line, wherein the fourth hydraulic line is arranged for flow between a second working chamber of the two working chambers and a second non-return valve into the third hydraulic line, wherein the fourth hydraulic line connects with the third hydraulic line between the second non-return valve and the second working chamber of the two working chambers.

2. The actuation system according to claim 1, further comprising a switching valve is arranged in at least one of the hydraulic lines connecting the at least one first pressure source to the hydraulically actuatable device.

3. The actuation system according to claim 1, further comprising a switching valve arranged in at least one of the hydraulic lines connecting the second pressure source to the hydraulically actuatable device.

4. The actuation system according to claim 1, wherein the first pressure source comprises a first piston-cylinder unit of a vehicle brake.

5. The actuation system according to claim 1, wherein the second pressure source comprises a second piston-cylinder unit, whose piston is configured to convey pressurising medium to the hydraulically actuatable device in both movement directions.

6. The actuation system according to claim 1, further comprising a path simulator that is operatively connected to a working space of the first pressure source.

7. The actuation system according to claim 1, further comprising an additional switching valve to a wheel brake cylinder arranged in one or more of the first, second or third hydraulic lines connecting the first and the second pressure sources to the hydraulically actuatable device.

8. The actuation system according to claim 1, further comprising:
a branch line from the first, second or third hydraulic lines connecting the first and the second pressure sources to the hydraulically actuatable device, and
an additional switching valve arranged in the branch line for return flow to a reservoir.

9. The actuation system according to claim 1, further comprising a switching valve arranged in a further connecting line that connects the second and third hydraulic lines.

10. The actuation system according to claim 1, further comprising a switching valve is arranged in a fifth hydraulic line that leads from one or both of the second and third hydraulic lines to a reservoir.

11. The actuation system according to claim 1, wherein one of the non-return valves is combined with the valve device in a further valve device.

12. A method for operating the actuation system according to claim 1, wherein the second pressure source is allocated to at least two hydraulic circuits in order to supply the at least two hydraulic circuits with pressurising medium, and wherein the second pressure source conveys pressurising medium in two delivery directions, the method including:
conveying pressurising medium in a controlled manner from a first of the at least two hydraulic circuits into a second of the at least two hydraulic circuits, and vice versa, via a switchable connection, using the second pressure source.

13. The actuation device according to claim 1, wherein the valve device comprises a solenoid valve.

14. An actuation system for at least one hydraulically actuatable device, comprising:
an actuation device,
at least one first pressure source configured to be actuated using the actuation device, and
a second pressure source, including
a pressure-generating organ that is moveable in two directions, and
an electro-mechanical drive for the pressure-generating organ,
wherein the at least one first pressure source is connected via at least one first hydraulic line and the second pressure source is connected via at least a second hydraulic line and a third hydraulic line to the hydraulically actuatable device in order to supply the at least one first pressure source and the second pressure source with pressurising medium or to otherwise pressurise them, and
the actuation system further comprising a valve arrangement configured to regulate pressure of the hydraulically actuatable device,
wherein pressurising medium is enabled to be supplied in a controlled manner by the second pressure source in both movement directions of the pressure-generating organ,
wherein the second and third hydraulic lines are connected to respective ones of two working chambers of the second pressure source and are connected by means of a fourth hydraulic line, and
wherein a valve device is arranged in the fourth hydraulic line connecting the two working chambers; and
wherein the actuation system further comprises a switching valve and a fifth hydraulic line that leads from one or both of the second and third hydraulic lines to a reservoir, wherein the switching valve is arranged in the fifth hydraulic line.

15. An actuation system for at least one hydraulically actuatable device, comprising:
an actuation device,
at least one first pressure source configured to be actuated using the actuation device, and
a second pressure source, including
a pressure-generating organ that is moveable in two directions, and
an electro-mechanical drive for the pressure-generating organ,
wherein the at least one first pressure source is connected via at least one first hydraulic line and the second pressure source is connected via at least a second hydraulic line and a third hydraulic line to the hydraulically actuatable device in order to supply the at least one first pressure source and the second pressure source with pressurising medium or to otherwise pressurise them, and
the actuation system further comprising a valve arrangement configured to regulate pressure of the hydraulically actuatable device,
wherein pressurising medium is enabled to be supplied in a controlled manner by the second pressure source in both movement directions of the pressure-generating organ, wherein the second and third hydraulic lines are connected to respective ones of two working chambers of the second pressure source and are connected by means of a fourth hydraulic line, and wherein a valve device is arranged in the fourth hydraulic line connecting the two working chambers; and wherein the actuation system further comprises a switching valve and a fifth hydraulic line that leads from at least one of the two working chambers to a reservoir, wherein the switching valve is arranged in the fifth hydraulic line.

* * * * *